United States Patent Office 3,014,882
Patented Dec. 26, 1961

3,014,882
VINYL CHLORIDE POLYMER COMPOSITIONS HAVING IMPROVED IMPACT STRENGTH
Pieter Bruin, Gerrit Wouter van Raamsdonk, and Gottfried Ernst Rumscheidt, Amsterdam, and Cornelis Ruinard, Vlaardingen, Netherlands, assignors to Shell Oil Company, a corporation of Delaware
No Drawing. Filed Sept. 11, 1957, Ser. No. 683,201
Claims priority, application Netherlands Sept. 14, 1956
14 Claims. (Cl. 260—23)

This invention relates to new vinyl chloride polymer compositions. More particularly, the invention relates to hard vinyl chloride polymer compositions containing a special ingredient which imparts improved impact strength thereto.

Specifically, the invention provides hard vinyl chloride polymer compositions having improved impact strength comprising a vinyl chloride polymer containing at least 75% vinyl chloride units blended with not more than 12 parts per 100 parts of vinyl chloride polymer of a fatty acid ester of a glycidyl polyether of a polyhydroxy-containing compound of the group consisting of polyhydric phenols and polyhydric alcohols.

Polyvinyl chloride has a combination of excellent physical properties which makes it desirable for use in the manufacture of many plastic articles, such as tubing and the like. The commercial material, however, possesses certain properties which limit its use in these applications. Polyvinyl chloride prepared by conventional methods, for example, has relatively poor impact strength and is thus unsuited for manufacture of rigid articles which must be exposed to blows or impact during use.

Addition of certain plasticizers in quantities of about 25 to 100 parts per 100 parts of polymer in some cases improves the impact strength of the vinyl chloride polymers. The articles prepared from this material, however, are soft and flexible and unsuited for use in manufacturing hard substantially rigid articles. Moreover, the tensile strength and softening temperature are greatly reduced by the addition of plasticizers.

It is an object of the invention, therefore, to provide new vinyl chloride polymer compositions. It is a further object to provide new vinyl chloride polymer compositions having improved impact strength and a method for their preparation. It is a further object to provide vinyl chloride polymer compositions which have good impact strength and still retain hardness and rigidity. It is a further object to provide new vinyl chloride polymer compositions having good impact strength and still retain good tensile strength and possess high softening points. Other objects and advantages of the invention will be apparent from the following detailed description thereof.

It has now been discovered that these and other objects of the invention may be accomplished by the novel compositions of the invention comprising a vinyl chloride polymer containing at least 75% vinyl chloride units blended with not more than 12 parts per 100 parts of vinyl chloride polymer of a fatty acid ester of a glycidyl polyether of a polyhydroxy-containing compound of the group consisting of polyhydric phenols and polyhydric alcohols. These special compositions have been found to have unexpectedly good impact strengths and hard rigid articles prepared therefrom can withstand considerable impact without breaking. Further, the compositions still possess good tensile strength and high softening points, properties which have been lost heretofore by the addition of plasticizing agents.

The fatty acid esters used in preparation of the compositions of the invention are fatty acid ester derivatives of resinous glycidyl polyethers of polyhydric alcohols or phenols, which polyethers contain both hydroxyl and epoxy groups. In the esterification, both the hydroxyl groups and the epoxy groups may be esterified. The epoxy group is considered as two OH groups.

The glycidyl polyethers used in making the fatty acid esters are preferably the glycidyl polyethers of polyhydric phenols such as obtained by reacting a polyhydric phenol with epichlorohydrin in the presence of caustic. These resinous hydroxy-containing polyethers may be represented by the following formula

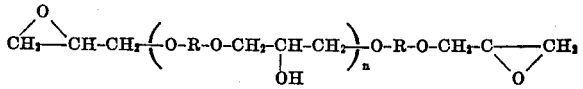

wherein R is the residue of the polyhydric phenol obtained by removing the hydroxyl groups and $n$ is an integer of at least 1. In some cases a part of the terminal epoxy groups may be hydrated.

Polyhydric phenols that may be used in the preparation of the above-described glycidyl polyethers include, among others, dihydric and polyhydric phenols such as, for example, resorcinol, catechol, hydroquinone, methyl resorcinol, or polynuclear phenols, such as 2,2-bis(4-hydroxyphenyl)propane (Bis-phenol–A), 2,2-bis(4-hydroxyphenyl)butane, 4,4'-dihydroxybenzophenone, 1,8-bis(4-hydroxyphenyl)octane, 2,2-bis(4-hydroxyphenyl)-pentane, and 1,5-dihydroxynaphthalene.

The glycidyl polyethers of the polyhydric phenols are prepared in known manner, e.g. by heating the polyhydric phenol at a temperature say of about 50–150° C. with epichlorohydrin in the presence of an alkali metal hydroxide. The mixture is heated for some hours, after which the resultant reaction product is washed with water until it no longer contains any alkali. By reducing the quantity of epichlorohydrin used per mol of polyhydric phenol, the molecular weight and softening point of the product are increased. High molecular weight products may also be prepared by reacting products having low molecular weights with a small amount of dihydric phenol.

For the preparation of fatty acid esters to be used in preparing the compositions of the present invention, the glycidyl polyethers of the polyhydric phenols preferably have a molecular weight of at least 350 and preferably a molecular weight between 900 and 3000. The preferred glycidyl ethers also have an esterification value of between 110 and 220, and more preferably between 150 and 200. Esterification value as used herein means the number of grams of the polyether with which 1 mol of monobasic acid may be completely esterified.

The preparation of several of such glycidyl polyethers is given below:

POLYETHER A

About 1 mol of 2,2-bis(4-hydroxyphenyl)propane and 1.88 mols of sodium hydroxide as a 10% aqueous solution were combined and heated to about 45° C. whereupon 1.57 mols of epichlorohydrin were added rapidly. The temperature increased and remained at about 95° C. The mixture separated into a two-phase system and the aqueous layer is drawn off. The resinous layer that remained is washed with hot water and then drained and dried at a temperature of 130° C. The product had a melting point of about 70° C., a molecular weight of 900, an epoxy value of 0.20 eq./100 g. and an esterification value of about 132.

POLYETHER B

A glycidyl polyether of higher melting point was prepared in similar manner with the exception that for each mol of the dihydric phenol there was employed 1.22 moles of epichlorohydrin and 1.37 mols of sodium hydroxide. The resulting product had a melting point of 98° C., a molecular weight of 1400, an epoxy value of 0.103 eq./100 g. and an esterification value of 174.

POLYETHER C

A glycidyl polyether having a melting point of 98° C. was heated to a temperature of 150° C. and 5% by weight of 2,2-bis(4-hydroxyphenyl)propane added after which the temperature was increased to 190° C. in about 30 minutes followed by maintaining the temperature at this point for 1½ hours. The product was a glycidyl polyether having a softening point of 131° C., an epoxy value of 0.05 eq./100 g., a mol weight of 2900 and an esterification value of 188.

Also of special interest are the polyglycidyl polyesters of polyhydric alcohols obtained by reacting a polyhydric alcohol with epichlorohydrin or glycerol dichlorohydrin in the presence of a catalyst and dehydrochlorinating the resulting product. A detailed description of a method for preparing these particular polyglycidyl polyethers may be found in Zech—U.S. 2,581,464. Special catalysts that may be used for the reaction of the polyhydric alcohol and epichlorohydrin are described in Marple et al.—U.S. 2,260,753 and U.S. 2,327,053.

The fatty acids used in the esterification of the above-described glycidyl polyethers may be saturated or unsaturated and branched or unbranched. They should contain at least 6 carbon atoms, and preferably from 12 to 22 carbon atoms. Examples of the fatty acids include, among others, fatty acids derived from linseed oil, soybean oil, dehydrated castor oil, cotton seed oil, coconut fatty acids, dimerized and trimerized oils derived from the above-described oils and the like.

The acids used in preparing the esters are generally the unsaturated fatty acids which preferably contain at least 12 carbon atoms and have an iodine value of at least 110 and preferably from 110 to 400. Although these acids are normally derived from natural oils, acids of the proper chain length and unsaturation from other sources are likewise suitable. Various natural oils classified as drying or semi-drying oils are suitable sources of the unsaturated fatty acids. Ordinarily the acid from the natural oil is a mixture of different fatty acids, some saturated and some unsaturated, and such mixtures are suited for use in making the esters of the glycidyl polyethers. Substantial quantities of the unsaturated fatty acids, e.g. the polyethylenically unsaturated monocarboxylic acids, occur (in the form of glycerides) in oil, such as linseed, soya bean, corn, cotton seed, kapok seed, herring, perilla, poppy seed, prichard, whale, manhaden, mustard, peanut, rape seed, salmon, malnut, dehydrated castor oil, rubber seed, safflower, tung and oiticica oils.

Instead of the products prepared by esterification of the glycidyl polyethers with a fatty acid, the reaction product of the glycidyl polyethers with fats or fatty oils, based on the above-mentioned fatty acids, may also be used in the compositions according to the present invention.

The fatty acid esters are preferably prepared by heating and reacting the fatty acid or oil with the glycidyl polyether of the polyhydroxy-containing compound. The esterification is preferably effected at temperatures of from about 25° C. to 275° C. in the presence or absence of an esterification catalyst, such as sulfuric acid, toluenesulfonic acid, or the like. Preferably, the esterification is conducted in an inert atmosphere such as by sparging with carbon dioxide. Since water is a product of the reaction, it is desirable to have present an inert azeotroping agent capable of removing the formed water by distillation. Xylene is an excellent material for this purpose, although other suitable agents, such as benzene, toluene and the like may be used.

In the ester, it is not necessary to have all the esterifiable groups esterified. However, at least 50% of the groups, and preferably 70% should be esterified.

In preparing the fatty acid esters then the glycidyl polyester is combined with an amount of acid which is sufficient to effect at least 50% esterification, i.e. an amount sufficient to furnish at least one carboxyl group for at least 50% of the esterifiable groups. This includes both the epoxy group and any hydroxyl group that may be present. Preferably the glycidyl polyether is combined with 70% to 90% of the equivalent amount. The mixture is then heated until the acid number of the product (solids basis) is reduced to less than 30, and preferably between 1 and 15.

The preparation of one of the fatty acid esters of the glycidyl ethers is illustrated below. Unless otherwise specified, parts indicate parts by weight.

POLYESTER A

In a glass reaction vessel fitted with a phase separating condenser, stirrer and carbon dioxide bubbler, a mixture of 1200 parts of Polyether D (esterification value 0.557 eq./100 g.) shown above and 1875 parts of linseed fatty acid (95% of theory) was upheated to 230° C. in 1¾ hours and held at that temperature for an additional 6 hours. The mixture was allowed to cool and reheated at a later time to 230° C. in 1½ hours after addition thereto as azeotroping agent of a petroleum solvent having a boiling range of about 315° F. to 380° F. and API gravity of about 34.1 and containing about 65% aromatics. The heating was continued at 230° C. for 6 hours during which time the acid number was reduced to 17.9. The product was cooled, diluted to 50% solids with addition of the petroleum solvent, and filtered to remove a very small amount of insoluble material.

The vinyl chloride polymers used in preparing the compositions of the invention include the homopolymer of vinyl chloride, i.e. polyvinyl chloride, and any copolymers of vinyl chloride with other monoethylenically unsaturated monomers wherein the copolymer contains at least 75% by weight of vinyl chloride units. The materials to be copolymerized with the vinyl chloride may be exemplified by vinyl acetate, diethyl fumarate, methyl methacrylate, methacrylonitrile, acrylonitrile, styrene, vinylidene chloride, allyl alcohol, ethyl vinyl succinate, allyl ethyl phthalate, vinyl benzoate, allyl acetate, and the like, and mixtures thereto.

Particularly preferred materials to be used in preparing the compositions of the invention include polyvinyl chloride and copolymers of vinyl chloride and members of the group consisting of ethylenically unsaturated esters, vinylidene chloride, styrene and acrylonitrile.

As is known, the molecular weight of the polyvinyl chloride affects its impact strength. The lower the molecular weight, the lower is the impact strength. With vinyl chloride polymers having high molecular weight, it is therefore possible to obtain the same impact strength with relatively less fatty acid ester. Vinyl chloride polymers having molecular weights of 15,000 to 200,000 (as measured by Staudinger method described in Ind. Eng. Chem. 36, page 1152 (1936)) may be used, however it is preferred to use polymers having mol weight between 25,000 and 150,000. Preferred polyvinyl chloride used in preparing the compositions of the invention have $k$-values between 66 and 74.

The fatty acid esters are added to the vinyl chloride polymer in an amount not in excess of 12 parts per 100 parts of the vinyl halide polymer. Particularly superior results are obtained by using quantities of fatty acid ester lying between 2 and 10 parts, and more preferably between 4 and 7 parts per 100 parts of the vinyl chloride polymer. Parts refer to parts by weight.

The fatty acid ester may be added to the vinyl chloride polymer at any time after polymerization, e.g. immediately after the polymerization or immediately before manufacture of the article. The polymer and fatty acid ester are preferably blended in any desired manner whereby intimate mixing of the materials is obtained. They may be mixed, for example, in a masticator or on rolls heated to temperatures say from about 100° C. to about 180° C., and preferred at 165° C.

Further ingredients, such as fillers, pigments, stabilizers, lubricants, etc., may be incorporated into the mixture. Examples of suitable stabilizers are organic compounds containing inorganic elements, tribasic sulphate, dibasic lead stearate, epoxy compounds and the like. The lubricants which may be used are, for example, calcium, stearate, glycerol mono-oleate and monostearate, cadmium stearate and octadecyl alcohol.

The compositions prepared according to the present invention may be worked up in the usual manner, e.g. by extrusion, injection molding, molding, rolling, etc. into shaped articles, which in addition to the increased impact strength possesses all the good properties of articles manufactured from hard vinyl chloride polymers.

To illustrate the manner in which the invention may be carried out, the following examples are given. It is to be understood that the examples are for the purpose of illustration and the invention is not to be regarded as limited to any of the specific compounds or conditions recited therein. Unless otherwise indicated, parts disclosed in the examples are parts by weight.

Example I

This example illustrates the unexpected improvement in impact strength possessed by a composition containing polyvinyl chloride and linseed oil fatty acid of Polyether B (50% esterified).

The linseed oil fatty acid in amounts shown in the following table was blended with 100 parts of polyvinyl chloride having a $k$-value of 71 (mol weight of 125,000), on a roller at a temperature of 165° C. for several minutes. Test pieces were made from the homogenized plastic masses in order to determine the Izod impact strength (ASTM D 256–47 T) or bending impact strength at 23° C. The results are shown in the following table.

| Linseed oil fatty acid of polyether B, 50% esterified; parts of ester per 100 parts of PVC | Izod impact strength, kg. cm./sq. cm. (23° C.) | Tensile strength, kg./sq. cm. |
|---|---|---|
| 0 | 7 | 520 |
| 1 | 13.4 | 499 |
| 2 | 25.6 | 478 |
| 5 | 22.6 | 446 |

When 5 parts of a commercial plasticizer (dioctyl phthalate) was added instead of 5 parts of the fatty acid ester (per 100 parts of the polyvinyl chloride), the impact strength was 5 kg. cm./sq. cm. and the tensile strength 420 kg./sq. cm. In order to obtain an impact strength comparable to that of a polyvinyl chloride modified with fatty acid ester of a glycidyl polyether, it would be necessary to add 25–30 parts of dioctyl phthalate, in which case, however, the tensile strength declines to approximately 280 kg./sq. cm. Reduction in heat distortion of the composition according to the invention is also very slight (from 75° C. without addition to 70° C. with 5 parts of fatty acid ester of polyether B determined according to ASTM D 648–45 T). For a similar composition comprising 5 and 25 parts, respectively, of dioctyl phthalate instead of the fatty acid ester, these values were 57° C. and 25° C., respectively.

Example II

Various compositons were prepared by mixing the following materials together on a roller at a temperature of 165° C.:

| | Parts |
|---|---|
| Polyvinyl chloride ($k$-value=71.0) | 100 |
| Advastab 50–671 (organic, sulfur-containing tin stabilizer) | 3 |
| Glycerol mono-stearate | 2 |
| Calcium stearate | 1½ |
| Fatty acid ester of glycidyl polyether | See table |

Test-pieces were made from the homogenized plastic masses in order to determine the Izod impact strength (A.S.T.M. D 256–47 T) or bending impact strength at 23° C.

| | Fatty acid ester of glycidyl polyether | | | Izod impact strength at 23° C. kg. cm./ sq. cm. | Bending impact strength, kg. cm./ sq. cm. (23° C.) |
|---|---|---|---|---|---|
| Test No. | Polyether | Fatty acid | Percent esterified | Number of parts added per 100 parts of PVC | | |
| 1 | B | linseed oil | 90 | 5 | | 101 |
| 2 | B | soya bean oil | 90 | 5 | 19.8 | 87 |
| 3 | B | stearic | 90 | 5 | 16.3 | |
| 4 | B | lauric | 90 | 5 | 20.9 | 100 |
| 5 | B | caprylic/ capric (50/50) | 50 | 5 | 14.2 | |
| 6 | B | stearic | 50 | 5 | 19.4 | |
| 7 | B | linseed oil | 50 | 5 | 22.6 | 91 |
| 8 | B | ...do | 80 | 5 | | 99 |
| 9 | A | ...do | 90 | 5 | 22.8 | 90 |
| 10 | C | ...do | 90 | 5 | 18.5 | 85 |
| 11 | C | cocoanut | 90 | 5 | 24.8 | 104 |
| 12 | C | ...do | 30 | 5 | 7.2 | |
| 13 | B | dehydrated castor oil | 90 | 5 | 20.3 | 94 |
| 14 | B | lauric | 50 | 5 | 13.5 | |

Example III

Example I is repeated using a copolymer of 95 parts of vinyl chloride and 5 parts of vinyl acetate and a copolymer of 90 parts vinyl chloride and 10 parts of diethyl fumarate in place of the polyvinyl chloride. Similar superior results are obtained.

Example IV

Example II is repeated using 7 parts of the fatty acid esters in the compositions. These compositions also possess the above-noted superior results.

We claim as our invention:

1. A thermoplastic composition comprising a vinyl chloride polymer selected from the group consisting of polyvinyl chloride and copolymers of vinyl chloride and dissimilar monoethylenically unsaturated monomers wherein the copolymers contain at least 75% vinyl chloride units, said vinyl chloride polymers having a molecular weight of at least 25,000 as determined by the Staudinger method, blended with from 1 to 12 parts per 100 parts of vinyl chloride polymer of a petroleum solvent soluble ester of a fatty acid containing at least 6 carbon atoms and a glycidyl polyether of a polyhydroxy-containing compound of the group consisting of polyhydric phenols and polyhydric alcohols, at least 50% of the esterifiable groups of the polyether being esterified with the fatty acid.

2. A composition as in claim 1 wherein the polymer is polyvinyl chloride.

3. A composition as in claim 1 wherein the fatty acid is a monocarboxylic acid containing from 12 to 22 carbon atoms.

4. A composition as in claim 1 wherein the fatty acid is a polyethylenically unsaturated fatty acid containing from 12 to 22 carbon atoms.

5. A composition as in claim 1 wherein the glycidyl polyether is a glycidyl polyether of a dihydric phenol.

6. A composition as in claim 1 wherein the glycidyl polyether is a glycidyl polyether of 2,2-bis(4-hydroxyphenyl)propane having a molecular weight between 900 and 3000.

7. A composition as in claim 1 wherein the fatty acid ester is used in an amount of 2 to 10 parts per 100 parts of polymer.

8. A thermoplastic composition comprising polyvinyl chloride having a molecular weight between 25,000 and 200,000 as determined by the Staudinger method blended with from 2 to 10 parts per 100 parts of the polyvinyl chloride of a petroleum solvent soluble ester of a fatty acid containing at least 6 carbon atoms and a glycidyl ether of 2,2-bis(4-hydoxyphenyl)propane, at least 50% of the esterifiable groups of the polyether being esterified with the fatty acid.

9. A composition as in claim 8 wherein the fatty acid is linseed oil fatty acid.

10. A composition as in claim 8 wherein the fatty acid is soya bean oil fatty acid.

11. A composition as in claim 8 wherein the fatty acid is coconut oil fatty acid.

12. A composition as in claim 8 wherein the polyvinyl chloride has a K-value of 66 to 74.

13. A process for preparing vinyl chloride polymer compositions having improved impact strength which comprises intimately mixing at a temperature between 100° and 180° C. into the vinyl chloride polymer selected from the group consisting of polyvinyl chloride and copolymers of vinyl chloride and dissimilar monoethylenically unsaturated monomers wherein the copolymers contain at least 75% vinyl chloride units with, said vinyl chloride polymers having a molecular weight of at least 25,000 as determined by the Staudinger method from 1 to 12 parts per 100 parts of vinyl chloride polymer of a petroleum solvent soluble ester of a fatty acid containing at least 6 carbon atoms and a glycidyl polyether of a polyhydroxy-containing compound of the group consisting of polyhydric phenols and polyhydric alcohols, at least 50% of the esterifiable groups of the polyether being esterified with the fatty acid.

14. A process comprising intimately mixing at a temperature between 100° C. and 180° C. 1 to 12 parts of an already prepared ester of a polyglycidyl ether of a polyhydric phenol and a fatty acid containing at least 12 carbon atoms, which glycidyl ether has at least 70% of the esterifiable groups esterfied with the fatty acid, with polyvinyl chloride, and removing a thermoplastic product having improved impact resistance as compared to the original polyvinyl chloride.

References Cited in the file of this patent

UNITED STATES PATENTS

| | | |
|---|---|---|
| 2,456,408 | Greenlee | Dec. 14, 1948 |
| 2,500,765 | Montague | Mar. 14, 1950 |
| 2,795,565 | Newey | June 11, 1957 |
| 2,882,251 | Christerson | Apr. 14, 1959 |
| 2,889,295 | Darby et al. | June 2, 1959 |
| 2,894,923 | Graham | July 14, 1959 |
| 2,912,397 | Houska | Nov. 10, 1959 |

FOREIGN PATENTS

| | | |
|---|---|---|
| 744,831 | Great Britain | Feb. 15, 1956 |
| 760,006 | Great Britain | Oct. 31, 1956 |

OTHER REFERENCES

Charlton: "Alloying With Epoxides," Modern Plastics, September 1954, pp. 155–61 and 240–43.

Turner et al.: "Polyepoxide Resin," Paint Manufacture, September 1956, pp. 321–26.